United States Patent
de Groot

(10) Patent No.: US 12,104,897 B2
(45) Date of Patent: Oct. 1, 2024

(54) INTEROMETRIC OPTICAL SYSTEM

(71) Applicant: Zygo Corporation, Middlefield, CT (US)

(72) Inventor: Peter J. de Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 205 days.

(21) Appl. No.: 17/887,678

(22) Filed: Aug. 15, 2022

(65) Prior Publication Data

US 2024/0053143 A1    Feb. 15, 2024

(51) Int. Cl.
| | | |
|---|---|---|
| G01B 11/30 | (2006.01) | |
| G01B 9/02055 | (2022.01) | |
| G01B 9/02056 | (2022.01) | |

(52) U.S. Cl.
CPC .......... *G01B 11/30* (2013.01); *G01B 9/02057* (2013.01); *G01B 9/02064* (2013.01)

(58) Field of Classification Search
CPC . G01B 11/30; G01B 9/02057; G01B 9/02064
See application file for complete search history.

(56) References Cited

U.S. PATENT DOCUMENTS

| | | | | |
|---|---|---|---|---|
| 4,872,755 | A * | 10/1989 | Kuchel | G01J 9/02 |
| | | | | 356/495 |
| 6,195,168 | B1 | 2/2001 | De Lega et al. | |
| 6,717,680 | B1 * | 4/2004 | Kuchel | G01B 11/306 |
| | | | | 356/514 |
| 6,924,898 | B2 | 8/2005 | Deck | |
| 7,046,371 | B2 | 5/2006 | De Lega et al. | |
| 7,057,737 | B2 | 6/2006 | Millerd et al. | |
| 7,057,738 | B2 | 6/2006 | Millerd et al. | |
| 7,230,717 | B2 | 6/2007 | Brock et al. | |
| 7,230,718 | B2 | 6/2007 | Millerd et al. | |
| 7,777,895 | B2 | 8/2010 | Medower et al. | |

(Continued)

OTHER PUBLICATIONS

Abdulhalim, "Spatial and temporal coherence effects in interference microscopy and full-field optical coherence tomography", *Annalen der Physik*, vol. 524, No. 12, pp. 787-804 (2012).

(Continued)

*Primary Examiner* — Dominic J Bologna
(74) *Attorney, Agent, or Firm* — Fish & Richardson P.C.

(57) ABSTRACT

An interferometric optical system for measuring a test object, including: i) a reference object comprising a partially reflective reference surface; ii) a light source module configured to direct first and second input beams through the reference surface to the test object at an angle to one another; iii) a detector positioned to detect light reflected from the reference surface and one or more surfaces of the test object; and iv) an aperture positioned to selectively block light from reaching the detector, wherein the angle between the first and second input beams causes the aperture to block light from the first input beam reflected by the reference surface and pass light from second input beam reflected by the reference surface, wherein the two input beams have a mutual coherence length smaller than twice an optical distance between the reference surface and the test object.

23 Claims, 4 Drawing Sheets

(56) References Cited

U.S. PATENT DOCUMENTS

| | | | | |
|---|---|---|---|---|
| 8,045,175 | B2* | 10/2011 | De Groot | G01B 9/02057 356/497 |
| 8,351,048 | B2 | 1/2013 | Millerd | |
| 10,591,284 | B2 | 3/2020 | Deck et al. | |
| 10,809,055 | B2* | 10/2020 | Huang | G01B 11/2441 |
| 2002/0145739 | A1* | 10/2002 | De Groot | G01B 11/06 356/503 |
| 2011/0007323 | A1* | 1/2011 | De Groot | G02B 21/14 356/519 |
| 2015/0077760 | A1* | 3/2015 | Koerner | G01B 9/02027 356/496 |

OTHER PUBLICATIONS

Biegen, "Determination of the phase change on reflection from two-beam interference", Optics Letters, vol. 19, No. 21, pp. 1690-1692 (Nov. 1, 1994).

De Groot, et al., "Fourier optics modelling of instrument response for interference microscopy", *Proceedings of SPIE*, vol. 11490, pp. 114900T-1-114900T-12 (Aug. 21, 2020).

De Groot, "The Fizeau Interferometer and Phase Shifting Interferometry", *Light: Introduction to Optics and Photonics*, Edited by J. F. Donnelly and N. M. Massa, Chapter 8.7.2, pp. 180-184 (New English Board of Higher Education, 2010).

Deck et al., "Large-aperture, equal-path interferometer for precision measurements of flat transparent surfaces", *Applied Optics*, vol. 53, No. 8, pp. 1546-1553 (Mar. 10, 2014).

Freischlad, "Large flat panel profiler", *Proc. SPIE*, vol. 2862, pp. 163-171 (1996).

Kimbrough et al., "Low Coherence Vibration Insensitive Fizeau Interferometer", *Proceedings of SPIE*, vol. 6292, pp. 62920F-1-62920F-12 (2006).

Küchel, "Spatial Coherence in Interferometry: Zygo's new method to reduce intrinsic noise in interferometers", *Proc. Optatec* (2004).

Mantravadi et al., "Newton, Fizeau, and Haidinger Interferometers", *Optical Shop Testing*, Edited by D. Malacara, pp. 1-45 (Wiley-Interscience) (2007).

Schwider, "White-light Fizeau interferometer", *Applied Optics*, vol. 36, No. 7, pp. 1433-1437 (Mar. 1, 1997).

Voelz, "Computational Fourier Optics: A Matlab Tutorial", *SPIE Press*, Bellingham, Washington (2011).

Zong et al., "Dynamic low-coherence interferometry using a double Fizeau cavity", *Optics Letters*, vol. 46, No. 9, pp. 2051-2054 (May 2021).

\* cited by examiner

Gap between reference and object surfaces / mm

INTEROMETRIC OPTICAL SYSTEM

FIELD

This disclosure relates to an interferometric optical system, such as, for example, an internally scanned equal path interferometer having a spatially extended light source.

BACKGROUND

Optical interferometers are optical systems that combine optical wave fronts to generate a measurable interference signal (e.g., a modulation in optical intensity) indicative of phase information of one wave front relative to the other wave front.

Accordingly, they can be used to characterize one or more optical surfaces of a measurement object (also equivalently referred to herein as "test object") based on wave fronts reflected by such surfaces. A Fizeau interferometer is an example of an optical interferometer. It uses a partially reflective reference surface to generate a reference wave front and pass a measurement wave front that is thereafter reflected back through the reference surface by the test object to interference with the reference wave front. See, e.g., P. de Groot, "Fizeau interferometer," in Light: Introduction to Optics and Photonics, edited by J. F. Donnelly and N. M. Massa, chapt. 8.7.2, pp. 180-184, (New England Board of Higher Education, 2010) and M. V. Mantravadi and D. Malacara, "Newton, Fizeau, and Haidinger Interferometers," in Optical Shop Testing, edited by D. Malacara, pp. 361-394, (Wiley-Interscience, 2007).

With regard to the present disclosure, test objects of interest include, for example, test objects having two or more conformal, semi-transparent surfaces, such as an optical flat with parallel front and back surfaces, or assemblies of optical components having conformal flat, spherical or freeform surfaces. The challenge with such objects is to be able to separate the reflections from each of the surfaces for topography measurement in the presence of these unwanted reflections. Prior art techniques for trying to address this challenge include: wide field interferometers with a low coherence light source (see, e.g., P. J. de Groot, L. L. Deck, J. F. Biegen and C. Koliopoulos "Equal-path interferometer", U.S. Pat. No. 8,045,175 (25 Oct. 2011)); coupled cavity methods with a low coherence light source (see, e.g., B. Kimbrough, J. Millerd, J. Wyant and J. Hayes, "Low Coherence Vibration Insensitive Fizeau Interferometer," in Interferometry XIII: Techniques and Analysis, Proc. of SPIE 6292, 62920F (2006); J. Schwider, "White-light Fizeau interferometer," Applied Optics 36 (7), 1433-1437 (1997); and M. Kuechel "Interferometer for measuring optical phase difference", U.S. Pat. No. 4,872,755 (Oct. 10, 1989)); swept wavelength methods (e.g., L. L. Deck "Methods and apparatus for interferometric dimensional metrology", U.S. Pat. No. 6,924,898 (Aug. 2, 2005)); and coherence scanning interferometry using interference microscope objectives (e.g., L. L. Deck and P. J. de Groot "Metrology of multilayer stacks", U.S. Pat. No. 10,591,284 (Mar. 17, 2020)).

SUMMARY

In general, in one aspect, disclosed is an interferometric optical system for measuring one or more surfaces of a test object. The system includes: i) a reference object comprising a partially reflective reference surface; ii) a light source module configured to direct first and second input beams through the reference surface to the test object at an angle to one another; iii) a detector positioned to detect light reflected from the reference surface and the one or more surfaces of the test object; and iv) an aperture positioned to selectively block light from reaching the detector, wherein the angle between the first and second input beams is selected to cause the aperture to block light from the first input beam reflected by the reference surface and pass light from second input beam reflected by the reference surface, wherein the two input beams have a mutual coherence length smaller than twice an optical distance between the reference surface and any of the test object surfaces.

Embodiments of the interferometric optical system may include any of the following features.

The light source module may include a common light source from which the first and second input beams are derived, and the common light source may be a spatially extended light source. For example, the spatially extended light source may include a light-emitting diode or an incandescent light source. Furthermore, the spatially extended light source may have an emitting area with a diameter greater than 0.1 mm, or greater than 1 mm, and less than 10 mm.

The light reflected from the reference surface and the one or more surfaces of the test object interfere at the detector to produce an interference pattern having a fringe contrast. Because the reference surface and the one or more surfaces of the test object produce an unequal path length for light from the first and second input beams from the light source module to the detector, the spatial extension of the spatially extended light source cause a defocus effect in the fringe contrast of the interference pattern I(D) as a function of a distance D between the reference surface and the one or more surfaces of the test object.

For example, when the light source module comprises an imaging system having an effective focal length $F_L$ and the system further comprises a collimator for collimating the first and second input beams from the light source module having an effective focal length $F_M$, the defocus effect in the fringe contrast I(D) can be expressed as:

$$I(D) = \frac{2}{R^2} \int_0^R \exp\left[i\Phi(\rho, D)\right]\rho d\rho,$$

where the phase offset $$\Phi(\rho, D) = 2Dk\left(\sqrt{1-\left(\frac{\rho}{F_M}\right)^2} - \sqrt{1-\left(\frac{\rho}{F_L}\right)^2}\right)$$

depends on the radial distance $\rho$ from an optical axis, k is the wavenumber of light emitted from the common light source, and R is a radius of the emitting area for the spatially extended light source.

In certain such embodiments, the system is designed with $F_M$ and $F_L$ selected to have values within 50% of one another to reduce the defocus effect, or more preferably, to have values within 20% of one another to reduce the defocus effect, or even more preferably, to have values within 10% of one another to reduce the defocus effect.

In yet further embodiments, the system includes at least one compensation element positioned along a light path from the light source module to the detector for reducing the defocus effect in the fringe contrast of the interference pattern caused by the spatial extension of the spatially extended light source. For example, the at least one compensation element may include a first compensation element positioned along the light path from the light source module to the detector for the first input beam and a second compensation element positioned along the light path from the light source module to the detector for the second input beam.

In certain embodiments, the at least one compensation element comprises a phase plate for imparting a spatially dependent phase delay for light transmitting through the phase plate. For example, the spatially dependent phase delay may have a ρ-dependent value $\phi(\rho,D)$ that exactly compensates for the phase delay $\Phi(\rho,D)$ introduced by the optical geometry, according to $$\phi(\rho,D) = -\Phi(\rho,D)$$

The compensating element or elements may include, for example, a conventional lens or combination of lenses to generate the phase delay $\phi(\rho,D)$, or a computer-generated hologram or other diffractive element.

In yet further embodiments, the at least one compensation element includes a variable transmission plate for imparting a spatially dependent attenuation of light transmitting through the plate. For example, the spatially dependent phase attenuation can be spatially dependent on a radial distance ρ from an optical axis for the light transmitting through the plate.

More generally, the system includes at least one compensation element positioned along a light path from the light source module to the detector for reducing a defocus effect in the fringe contrast of the interference pattern caused by the spatial extension of the spatially extended light source, wherein the at least one compensation element may impart a spatially dependent phase delay, a spatially dependent attenuation, or both, for light transmitting through the at least one compensation element. For example, the at least one compensation element may include a first compensation element positioned along the light path from the light source module to the detector for the first input beam and a second compensation element positioned along the light path from the light source module to the detector for the second input beam.

The system may further include a test object stage for adjustably positioning the test object relative to the reference object and configurable to cause a selected one of the test object surfaces to reflect light from the first input beam to pass through the aperture and interfere at the detector with the light from the second input beam that is reflected by the reference surface and passed by the aperture. The aperture may be positioned to block light from the second input beam that is reflected by the selected test object surface. Also, for example, the test object stage may be configurable to orient the test object relative to the reference object to cause carrier fringes at the detector.

The light source module may direct the first input beam towards the reference surface from a first source location and direct the second input beam towards the reference surface from a second source location, wherein the first and second source locations are spatially separated from one another. For example, the light source module may include first and second optical fibers, wherein the first source location corresponds to an output of the first optical fiber and the second source location corresponds to an output of the second optical fiber.

The light source module may include a common light source having a coherence length smaller than twice the optical distance between the reference surface and any of the test object surfaces, wherein the first and second input beams are derived from the common light source, and wherein the common light source sets the mutual coherence length of the first and second input beams. For example, the common light source may include a light-emitting diode, a superluminescent diode, a multimode laser, or an incandescent bulb.

The light from the second input beam reflected by the reference surface and passed by the aperture defines a reference beam, and wherein the aperture may be configured to pass light from the first input beam that is reflected by a selected surface of the test object to define a measurement beam, and wherein the detector may be positioned to measure interference produced by a superposition of the reference beam and the measurement beam. The light source module may be configurable to adjust an optical path length difference between the reference and measurement beams. For example, the light source module may further include a common light source, wherein the first and second input beams are derived from the common light source, and wherein the light source module further includes an optical delay line positioned optically between the common light source and the reference surface for adjusting the optical path length difference between the reference and measurement beams.

The light source module may further include a beamsplitter for separating a common beam from the common light source into the first and second input beams. The optical delay line may be positioned optically between the beamsplitter and the reference object to adjust a group-velocity delay of the first input beam relative to the second input beam. The optical path length from the common source to the detector for light corresponding to the reference beam defines a reference beam optical path length, wherein an optical path length from the common source to the detector for light corresponding to the measurement beam defines a measurement beam optical path length, and wherein the optical delay line is adjustable to cause the optical path length difference between the reference beam optical path length and the measurement beam optical path length to be less than the mutual coherence length.

The light source module may be configurable to adjust an optical path length difference between the reference and measurement beams over a range greater than the mutual coherence length. The test object may comprise multiple surfaces positioned to reflect light from the input beams, and wherein the mutual coherence length is smaller than a round-trip optical path between any two of the multiple surfaces of the test object. The system may further include an electronic control system coupled to the detector and the light source module, where the electronic control system is configured to variably adjust the optical path length difference. For example, the electronic control system may be configurable to cause the light source module to adjust the optical path difference to cause the interference between the reference beam and the measurement beam for the selected surface but not cause interference between the reference beam and light from the first input beam reflected by any other of the multiple surfaces of the test object. For example, when the test object includes multiple surfaces positioned to reflect light from the input beams, and the mutual coherence length for the two input beams provided by the light source module may be smaller than 1 mm.

The detector may include a spatial array of detector elements for detecting an optical interference pattern derived from the first and second input beam.

The light source module may provide the first and second input beams as polarized input beams.

The light source module may configurable to adjust the relative intensities of the first and second input beams.

In general, in another aspect, disclosed is an interferometric method for measuring one or more surfaces of a test object including: i) directing first and second input beams through a partially reflective reference surface to the test object at an angle to one another; ii) detecting light reflected from the reference surface and the one or more surfaces of the test object; and iii) using an aperture to block light from the first input beam reflected by the reference surface and pass light from second input beam reflected by the reference surface, wherein the two input beams have a mutual coherence length smaller than twice an optical distance between the reference surface and any of the test object surfaces.

Embodiments of the method may include features corresponding to those above for the interferometric optical system, as well as any of the following.

The light from the second input beam reflected by the reference surface defines a reference beam, and the method may further include using the aperture to pass light from the first input beam reflected by a selected one of the test object surfaces to define a measurement beam, and wherein the detecting includes detecting interference produced by a superposition of the reference and measurement beams. The aperture may further be used to block light from the second input beam that is reflected by selected test object surface.

The method may further include adjusting an optical path length difference between the reference beam and the measurement beam to cause the interference corresponding to the selected test object surface.

The test object may include multiple surfaces positioned to reflect the input beams, and wherein the mutual coherence length may be selected to be smaller than a round-trip optical path between any two of the multiple surfaces of the test object.

The first and second input beams may be derived from a common source, and the common light source sets the mutual coherence length of the first and second input beams.

In general, in yet another aspect, disclosed is an optical assembly for use as an interferometer, configured to: i) direct light from a first light source to pass through a semi-transparent reference surface to an object surface, whereupon it reflects and passes through the reference surface again in the opposite direction from the first pass through the reference surface, then passes through an aperture stop prior to a detector, defining a measurement beam; ii) direct light from the second light source to the reference surface, where it reflects and passes through the aperture prior to reaching the detector, defining a reference beam, wherein: iii) the round-trip optical path length for the measurement beam segment measured from the reference surface to the object surface is greater than the mutual coherence length of the first and the second light source; iv) the difference in the complete optical path length for the measurement beam from the first light source to the detector and the complete optical path length for the reference beam from the second light source to the detector is less than the mutual coherence length of the first and the second light source, resulting in an interference effect at the detector, and v) unwanted reflected light from the reference surface from the first light source and unwanted reflected light from the object surface from the second light source are blocked by the aperture.

All documents referred to herein, if any, are incorporated by reference in their entirety. In case of conflict with the present disclosure, and any document incorporated by reference, the present disclosure controls.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
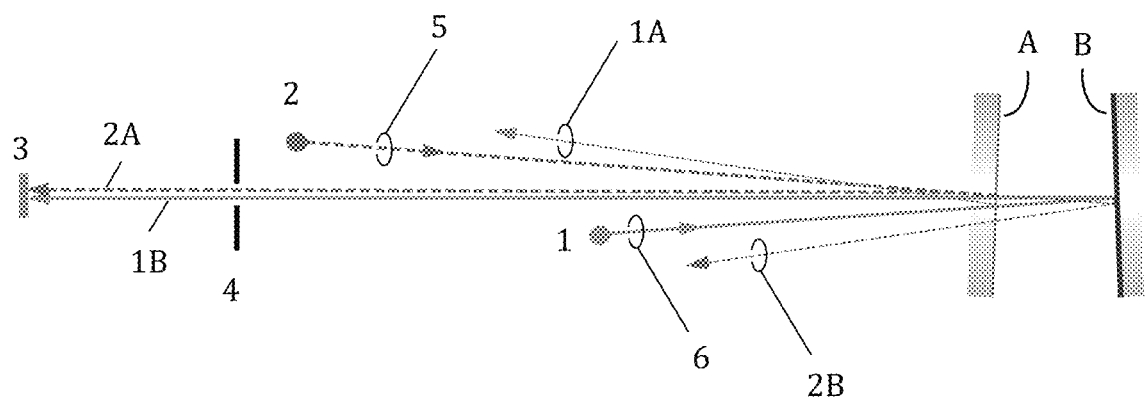
FIG. 1 is a schematic diagram of an embodiment of an optical interferometric system.

In certain embodiments, disclosed herein is an internally scanned equal path length interferometer in a geometry that is similar in overall functionality to a laser Fizeau interferometer. The interferometer uses an incoherent light source with a relative tilt between an object surface and a semi-transparent reference surface (what sometimes called a "transmission flat" or "transmission sphere") to assist in separating the measurement and reference paths in an interferometer that otherwise resembles a laser Fizeau interferometer. By making two copies of the incoherent light source, for example by using a compact Michelson-type interferometer with a built-in tilt angle and an optical path delay, the separated measurement and reference paths can be adjusted to be equal, resulting in an interference effect even with a low-coherence light source. Unlike a coupled-cavity interferometer, the unwanted reflections and incoherent contributions to the interference signal are rejected by the geometry of the interferometer, resulting in high fringe contrast and signal to noise.

For example, in at least one aspect, embodiments include an optical assembly for use as an interferometer with first and second light sources, wherein the optical assembly is configured to: i) direct light from the first light source to pass through a semi-transparent reference surface to an object surface, whereupon it reflects and passes through the reference surface again in the opposite direction from the first pass through the reference surface, then passes through an aperture stop prior to a detector, defining a measurement beam; and ii) direct light from the second light source to the reference surface, where it reflects and passes through the aperture prior to reaching the detector, defining a reference beam.

The optical assembly further includes the following features: i) the round-trip optical path length for the measurement beam segment measured from the reference surface to the object surface is greater than the mutual coherence length of the first and the second light source; ii) the difference in the complete optical path length for the measurement beam from the first light source to the detector and the complete optical path length for the reference beam from the second light source to the detector is less than the mutual coherence length of the first and the second light source, resulting in an interference effect at the detector; and iii) unwanted reflected light from the reference surface from the first light source and unwanted reflected light from the object surface from the second light source are blocked by the aperture. The combination of the limited mutual coherence length and the aperture enable the optical assembly to suppress unwanted or accidental reflections within the interferometric optical assembly.

The first and second light sources may correspond to first and second light source locations derived from a common light source, for example, by using a free-space beamsplitter and/or a fiber-optical beamsplitter, and using additional optical assemblies to balance and optionally adjust the measurement and reference optical path lengths. For example, these additional assemblies may comprise prisms, mirrors, lenses and optical fibers. In other embodiments, the first and second light sources are derived from separate sources that are at least partially phase-locked to provide some length mutual coherence.

Where the first and second light sources are derived from a common light source, the common light source may be any of a light-emitting diode, a super-luminescent diode, a multimode laser, an incandescent bulb, or any other source that has an emission spectral bandwidth and/or source shape that determine the mutual coherence length. Furthermore, the first and second light sources and the common light source may be part of light source module for the providing the light emitting from the first and second source locations. This light source module may include additional bulk optical elements and/or fiber optical elements for coupling the common light source to the first and second source locations, including any of: additional elements for filtering and/or narrowing the spectral emission from the common source to thereby further adjust the mutual coherence length; variable beam-splitting and/or amplitude modulation elements for adjusting the relative intensities of the light emitted from the first and second light source locations to thereby optimize fringe contrast in the ultimate optical interference pattern; and/or polarizing elements for selectively polarizing the output from each of the first and second light source locations to thereby enable the use of polarization techniques using polarized cameras for instantaneous interferometry. The light source module may also include any of the additional optical assemblies to balance and optionally adjust the measurement and reference optical path lengths.

The optical assembly for balancing the measurement and reference optical path lengths may include means for adjusting the optical path difference between the measurement and reference beams, for example, by adjusting the physical location of the first and second light sources, or by adjusting the group-velocity delay of the first light source with respect to the second light source. The latter may be accomplished by using an optical delay line.

The optical assembly may further include additional optical elements to image the object surface, and a detector for measuring the optical interference produced by the measurement and reference beams (e.g., a camera with multiple image pixels corresponding to multiple measurement locations on the object surface, for the purpose of measuring the topography or other characteristic of the object surface using interferometry).

With such additional elements, the optical assembly may be configured to measure the topography of flat surfaces, spherical surfaces, aspherical surfaces, or freeform surfaces, both individually and as part of an assembly that may have two or more conformal surfaces. Furthermore, in certain embodiment, the optical assembly is configured to separate multiple reflections from the object resulting from multiple (two or more) semi-reflecting object surfaces, wherein at least some of the semi-reflecting object surfaces have optical path separations greater than the mutual coherence length, such that the surface examined using interferometry are selectable by adjusting the optical path difference between the measurement and reference beams, e.g., by using the optical delay line.

FIG. 1 schematically illustrates a general embodiment. There are two light source locations, light source 1 and light source 2. Light source 1 provides input beam 6, and light source 2 provides input beam 5. The input beams are each directed partially through a semi-transparent reference surface A of a reference object to a measurement surface B of a measurement object. The reference surface A and measurement surface B are tilted relative to one another. Light source 1 is configured to direct input beam 6 in a direction relative to measurement surface B to partially transmit through reference surface A and reflect from measurement surface B to define a measurement beam 1B that passes back through the semi-transparent reference surface A and an aperture stop 4 to detector 3 Light source 2 is configured to direct input beam 5 in a direction to partially reflect from reference surface A to define a reference beam 2A that also passes through the aperture stop 4 to detector 3, where it overlaps with measurement beam 1B. On the other hand, the portion 1A of input beam 6 that is partially reflected by reference surface A and the portion 2B of input beam 5 that is partially transmitted through reference surface A, reflected by measurement surface B, and then partially transmitted back through reference surface A, are each blocked by aperture stop and do not reach detector 4.

Figure 2:
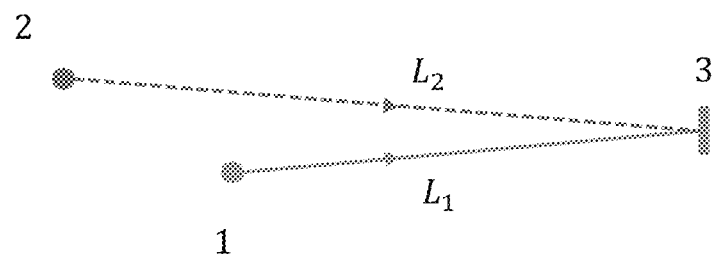
FIG. 2 is a schematic diagram of the embodiment of FIG. 1 to explain the concept of mutual coherence length (MCL).

The two light sources 1 and 2 have a mutual coherence length (MCL) $L_C$ as schematically illustrated in FIG. 2, which shows the two light sources illuminating a detector 3, resulting in an interference effect. The optical path length (OPL) $L_1$ is the physical distance from the source 1 to the detector 3 multiplied by the refractive index n of the ambient medium, while the OPL $L_2$ is the physical distance from the source 2 to the detector 3 multiplied by the index n. The optical path difference (OPD) is given by $$L_\Delta = L_2 - L_1 \quad (1)$$

When the OPD $L_\Delta$ equals the MCL $L_C$, the fringe contrast of the optical interference intensity at the detector 3 is reduced by a fraction 1/e relative to the fringe contrast achieved when the OPD equals zero. For OPD values $L_\Delta$ beyond the MCL $L_C$, the fringe contrast is low, whereas for an OPD much less than the MCL, the contrast is high, and is maximized when the OPD is zero.

Returning to FIG. 1, the OPL $L_1$ for the measurement beam 1B is given by the optical path from light source 1 through reference surface A to measurement surface B and back again through reference surface A and onto detector 3, whereas the OPL $L_2$ for the reference beam is given by the optical path from light source 2 to reference surface A and then back to detector 3. High-contrast fringes appear at the detector if the OPD $L_A$ defined in Eq. (1) is less than the MCL $L_C$, assuming a zero-offset in group velocity delay between the two light source 1 and 2. On the other hand, the MCL $L_C$ for the two sources 1 and 2 may be offset by a non-zero delay length (DL) $L_0$, corresponding to a group-velocity delay for light emitted by light source 1 with respect to light source 2. The requirement for high fringe contrast for the optical assembly is then given by $$|L_A - L_0| < L_C \qquad (2)$$

Referring still to FIG. 1, the object surface B and the reference surfaces A are separated in space, resulting in a contribution to the OPL of the measurement beam 1B but not to the reference beam 2A. This difference, which would otherwise reduce fringe contrast, can be compensated in many ways depending on the embodiment. For example, in the embodiment schematically depicted in FIG. 1, the separation of the object and reference surfaces is compensated by the location light source 2 relative to light source 1, resulting in high fringe contrast even if the round-trip separation of the two surfaces A and B is larger than the MCL $L_C$ and there is zero DL for the light sources 1 and 2. In other embodiments, the two light sources 1 and 2 may be located differently and include a non-zero delay length $L_0$ to offset the MCL, e.g., by including an internal optical delay line or the like, such as described in further embodiments below.

As noted above, unwanted reflections 1A and 2B shown in FIG. 1 are blocked by the aperture 4, by the configuration of the optical assembly. To achieve this, the object surface B and the reference surface A may be oriented with an angle between them, compensating for the difference in incident angles for the measurement beam 1B and the reference light beam 2A as they arrive from the light sources 1 and 2, while directing the unwanted reflections 1A and 2B away from the center of the aperture stop so that they are rejected. For example, the measurement object having the measurement surface B can be mounted on a rotatable stage to adjustably position it relative to light sources 1 and 2 and reference surface A. In this way, the interference effect at the detector 3 has high contrast, undisturbed by non-interfering beams that have not been compensated for their OPD.

Figure 3:
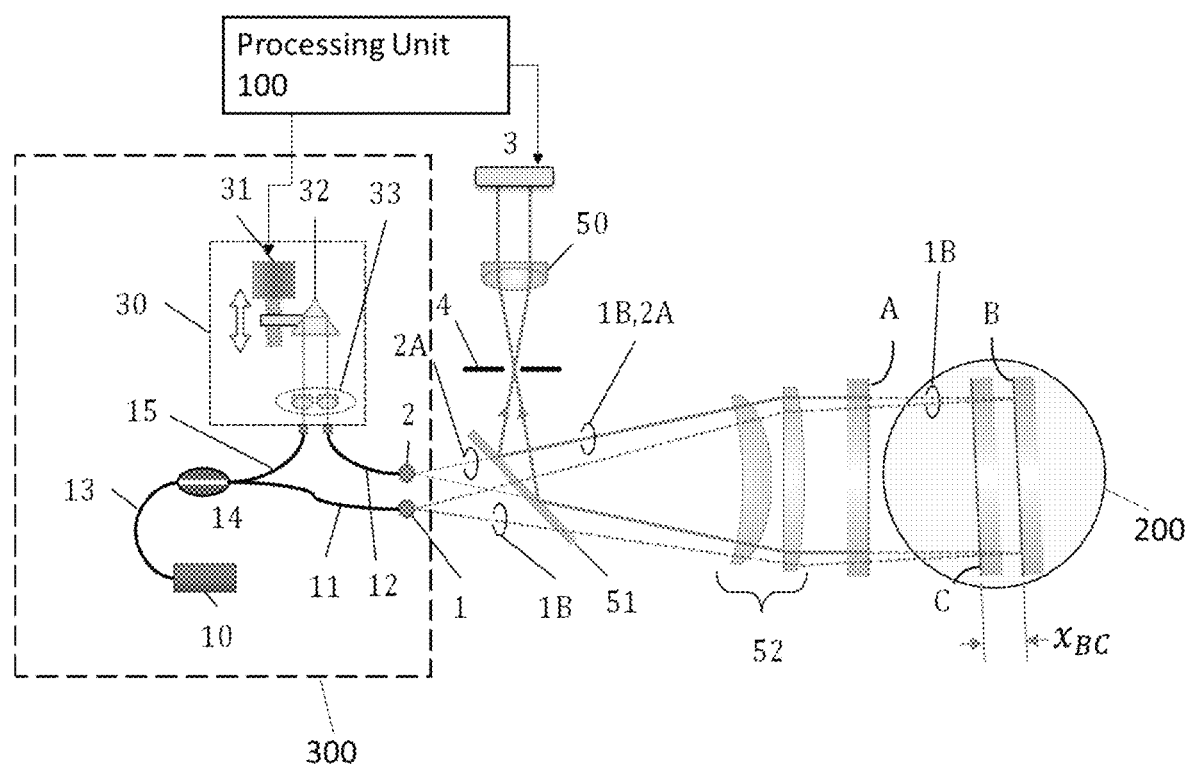
FIG. 3 is a schematic diagram of a further embodiment of an optical interferometric system.

FIG. 3 is a schematic diagram of a further embodiment, demonstrating an adjustable delay length to offset the MCL for the two light source and further demonstrating how embodiments of the invention may be used to isolate a certain measurement surface of interest from measurement objects having multiple reflective surfaces, such as measurement objects comprising planar stacks or multi-layer structures. As shown in FIG. 3, the measurement object includes two semi-reflective, nominally parallel surfaces B and C. In this embodiment, the MCL $L_C$ is configured such that it is less than the round-trip distance between surfaces B and C along a direction normal to both surfaces:

$$x_{BC} > L_C \qquad (3)$$

The limited MCL therefore allows for isolating either object surface B or C for interferometric analysis at the detector 3, independently of the other object surface, by the relative strength of the fringe contrast corresponding to reflections from a selected one of surfaces B and C.

Additional components of the embodiment of FIG. 3 include a collimating lens assembly 52 and a camera lens 50 for creating an image of either surface B or C on the detector 3, which may be a multi-element camera array for transforming the projected interference pattern for further analysis by data acquisition and processing means 100. As shown, the light sources 1 and 2 are placed at a distance nominally equal to one focal length from the collimating lens assembly 52, while the detector 3 and the desired surface B or C are at conjugate image points of the camera lens 50. A beamsplitter 51 facilitates the positioning of the illumination and imaging components of the optical assembly.

Additional components of the embodiment of FIG. 3 include a common light source 10. This common light source has a coherence length $L_C$ determined by its spectral emission bandwidth. For example, if the emission spectrum has a center wavelength $\lambda_M$ and is Gaussian in shape with a half width to the 1/e points given by $\lambda_{BW}$, then $$L_C = \frac{\lambda_M^2}{\lambda_{BW}}. \qquad (4)$$

The common light source 10 is coupled via fiber 13 to the fiber beamsplitter 14. A portion of the light is sent to the emission point for source 1 via fiber 11. Another portion is sent via fiber 15 to the optical delay line 30, which itself is comprised of fiber collimators 33, a retro-reflecting prism 32, and a motorized or manual actuator 31 to adjust the DL $L_0$ that appears in Eq. (2). The output of the optical delay line 30 is connected to source 2 via a fiber 12. By means of the path delay adjusting mechanism 31, which is may be controlled by data acquisition and processing unit 100, the system selects either object surface B or object surface C for inspection. For example, to select object surface B, the processing unit 100 causes optical delay line to be adjusted so that $L_0$ causes Equation 2 to be satisfied for the OPD for the portion of measurement beam 1B reflected from object surface B and the reference beam 2A, but not for the portion of measurement beam reflected from object surface C and the reference beam 1B.

Similar to FIG. 1, in FIG. 3 the reference surface A and the object surface B are oriented such that they are not perfectly parallel, compensating for the difference in incident angles for the measurement beam 1B and the reference light beam 2A as they arrive from the sources 1,2, while directing the unwanted reflections 1A and 2B away from the center of the aperture stop so that they are rejected. For example, this can be accomplished by measurement object stage 200 to adjustably position the measurement object having surfaces B and C relative to the rest of the interferometric assembly, including light sources 1 and 2 and reference surface A. In this way, the interference effect at the detector 3 has high contrast, undisturbed by non-interfering beams that have not been compensated for their OPD.

The components between common source 10 and light sources 1 and 2 collectively define a light source module 300 providing input beams from light source locations 1 and 2 with an MCL equal to the coherence length $L_c$ of the common source 10. In further embodiments, the light source module may include separate light sources not derived from a common source and defining a mutual coherence length.

In yet further embodiments, the system may include polarization optics to separately polarize the measurement and reference beams (e.g., at their respective source locations) for use with a detector comprising a polarization sensitive camera. Such a configuration enables instantaneous polarization interferometry techniques known in the art. In yet further embodiments, the system may include optical components (e.g., variable beamsplitters, attenuators, and/or amplifiers) for adjusting the relative intensity of the measurement and reference beams, e.g., at their respective source locations, for achieving maximum fringe contrast. In yet further embodiments, the system may further incorporate methods for orienting the reference and object surfaces with respect to one another to create carrier fringes for in-situ calibration purposes, as taught, for example, in commonly owned U.S. Pat. No. 9,103,649.

Finally, depending on the embodiment, the light source module can be configured to provide a MCL for the two input beams suitable for the application at issue. For example, to distinguish among multiple parallel, partially reflective surfaces in planar waveguide stacks, the MCL may be selected to be less than the round-trip OPL between two adjacent surfaces. In general, for many applications, the MCL may be in the range of between 5 microns and 100 mm. As noted above, the light source module may include additional elements for filtering (e.g., narrowing or flattening and thereby broadening) the spectral emission from the common source to thereby further adjust the mutual coherence length.

The specific embodiments described above assumed that the light source size is small enough that one can ignore spatial coherence effects. This is meaningful for illuminators such as super-luminescent laser diodes or light source assemblies based on single-mode fibers. More generally, embodiments can accommodate spatially extended light sources. Moreover, unlike in prior-art Fizeau type interferometers where large light sources and large gaps between the reference and test object can cause reduced fringe contrast in the interference patterns of interest, the present embodiments may include additional components to compensate for the spatial coherence effects caused by a spatially extended light source by exploiting the separated light sources for reference and measurement paths in the present embodiments. Such embodiments will now be described.

Large or spatially extended light sources include, for example a light-emitting diode (LED) or an incandescent light source. An extended light source can have, for example, a size of 0.1 to 10 mm, compared to a point-like source, which may only be about 0.01 mm in diameter. Extended light sources are usually characterized as an ensemble of independent point like sources that are mutually incoherent, in that neighboring points do not interfere with each other. A complete optical system with an extended, spatially incoherent light source is often referred to as partially coherent. Background information on partial coherence include, for example, Abdulhalim, I., "Spatial and temporal coherence effects in interference microscopy and full-field optical coherence tomography," Annalen der Physik 524(12), 787-804 (2012). Commonly owned U.S. Pat. Nos. 6,195,168 and 7,046,371 provide additional information on the use of extended light sources for applications in surface topography measurement.

There can be advantages to using extended light sources, including wider availability of such sources, and reduced coherent noise. See, e.g., Deck, L. L., de Groot, P. J., and Soobitsky, J. A., "Large-aperture, equal-path interferometer for precision measurements of flat transparent surfaces," Applied Optics 53(8), 1546-1553 (2014), and Freischlad, K. R., "Large flat panel profiler," Proc. SPIE 2862, 163-171 (1996). However, it is well-known that extended light sources can reduce fringe contrast and hence signal-to-noise in interferometer. The example prior-art Fizeau interferometry configuration shown in the optical schematic diagram of FIG. 4 is useful for describing this effect.

Figure 4:
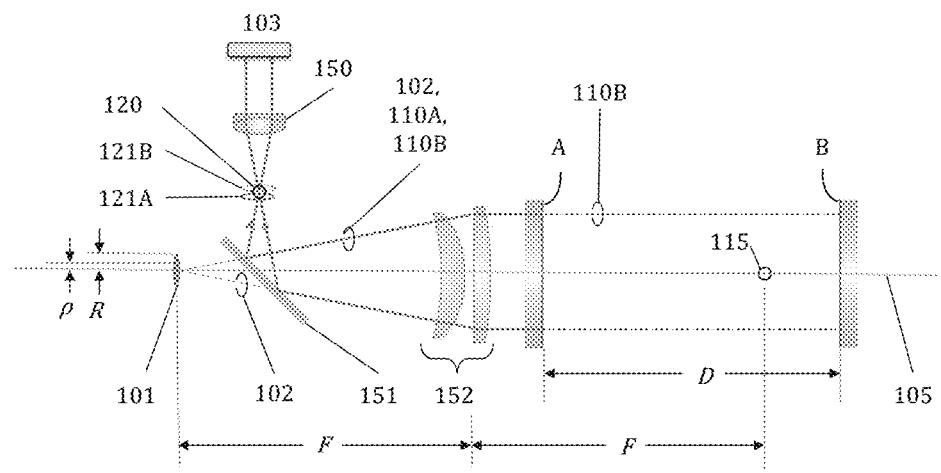
FIG. 4 is a schematic diagram of a prior art Fizeau-type interferometer with an extended source for demonstrating the reduction in fringe contrast caused by the presence of the spatially extended source.

In this configuration in FIG. 4, an extended light source 101 sends light through a beamsplitter 151, and after passing through collimator 152 and reflecting from the reference surface A and object surface B, is directed by beamsplitter 151 to the imaging lens 150 and onto the camera 103. The extended light source 101 has an object source image 121A and a reference source image 121B at a system focus 120, near the back focal point of the collimator 152. Most often, neither the reference surface A, nor the object surface B, are at the position of the front focal point 115 of the collimator. Consequently, the images 121A and 121B of the light sources have a field-dependent phase curvature representing defocus of these surfaces. This phase curvature may be calculated from the equation $$\phi(\rho, z) = zk\sqrt{1 - \left(\frac{\rho}{F}\right)^2} \quad (5)$$

where the coordinate ρ is the radial distance from the optical axis 105, F is the focal length of the collimator (assumed equal for both front and back focal points), k is the angular wavenumber given by 2π divided by the wavelength, and z is the distance of a reflecting surface from the front focal point. (See, e.g., de Groot, P., and Colonna de Lega, X., "Fourier optics modelling of instrument response for interference microscopy," Proc. SPIE 11490, 114900T.1-12 (2020)). The difference in phase curvature at the system focus for the light source images corresponding to the reference and object surfaces is therefore $$\phi(\rho, D) = 2Dk\sqrt{1 - \left(\frac{\rho}{F}\right)^2} \quad (6)$$

where D is the distance from the reference surface A to the object surface B. The resulting interference effect I(D) for a single surface point is represented by the integration of the resulting complex amplitude with phases φ over all light source points, normalized by the area of the disk. For reference and object beams of equal intensity and a circular aperture of radius R uniformly filled with light (where R corresponds to the radius of the spatially extended light source), the integration is over annuli of area 2πρdρ normalized to the area πR²:

$$I(D) = \frac{2}{R^2}\int_0^R \exp\left[i2Dk\sqrt{1 - \left(\frac{\rho}{F}\right)^2}\right]\rho d\rho. \quad (7)$$

Figure 5:
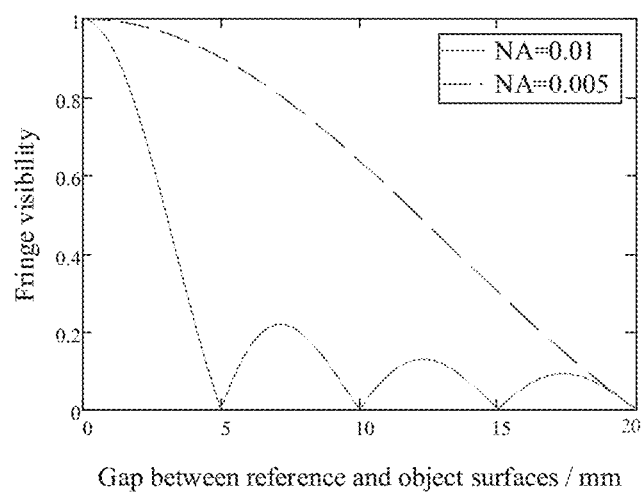
FIG. 5 is a graph illustrating the fringe contrast as a function of the gap D shown in FIG. 4 for the Fizeau interferometer for two different numerical aperture (NA) values, where the NA is approximately the radius of the source disk for the spatially extended source and the focal length F of the collimator collimating the light from the source in the interferometer for illuminating the reference and test surfaces.

For ρ<<F, the result is $$I(D) = V(D)\exp(i\theta) \quad (8)$$

where $$V(D) = \text{sinc}(\tfrac{1}{2}kDA_N^2) \quad (9)$$

$$\theta = kD \quad (10)$$

and $$A_N = R/F \quad (11)$$

is the approximate numerical aperture (NA) of the optical system. The fringe visibility or contrast is defined here as the absolute value of I(D) and is given by V(D) in Eq. (9). This equation or a similar equation has been derived in the literature using ray tracing in the interferometer cavity (see, e.g., Küchel, M., "Spatial Coherence in Interferometry: Zygo's new method to reduce intrinsic noise in interferometers," Proc. Optatec (2004)), the van-Cittert Zernike equation (see, e.g., Biegen, J. F., "Determination of the phase change on reflection from two-beam interference," Optics Letters 19(21), 1690 (1994)), and the complex degree of coherence (see, e.g., Freischlad, K. R., "Large flat panel profiler," Proc. SPIE 2862, 163-171 (1996)). FIG. 5 shows the resulting fringe contrast as a function of spacing between the reference and measurement surface for two different NA values, using Eq. (9) derived in the previous paragraph. The result can be generalized to any two-beam interferometer that has an optical system, for example a Twyman-Green interferometer, that employs imaging optics and a spatially-extended light source.

A similar calculation as that leading to FIG. 5 applies to the embodiments disclosed herein that implement a spatially extended source, indicating a limitation on the size of the gap between the reference and measurement surfaces for extended light sources. However, the present embodiments can compensate for this reduction in fringe contrast because the embodiments herein implement two spatially distinct light sources (whether or not derived from a single common source) rather than only a single light source, as in FIG. 4, and thereby enable addressing this issue by providing a corrective relative phase delay for the two sources.

Figure 6:
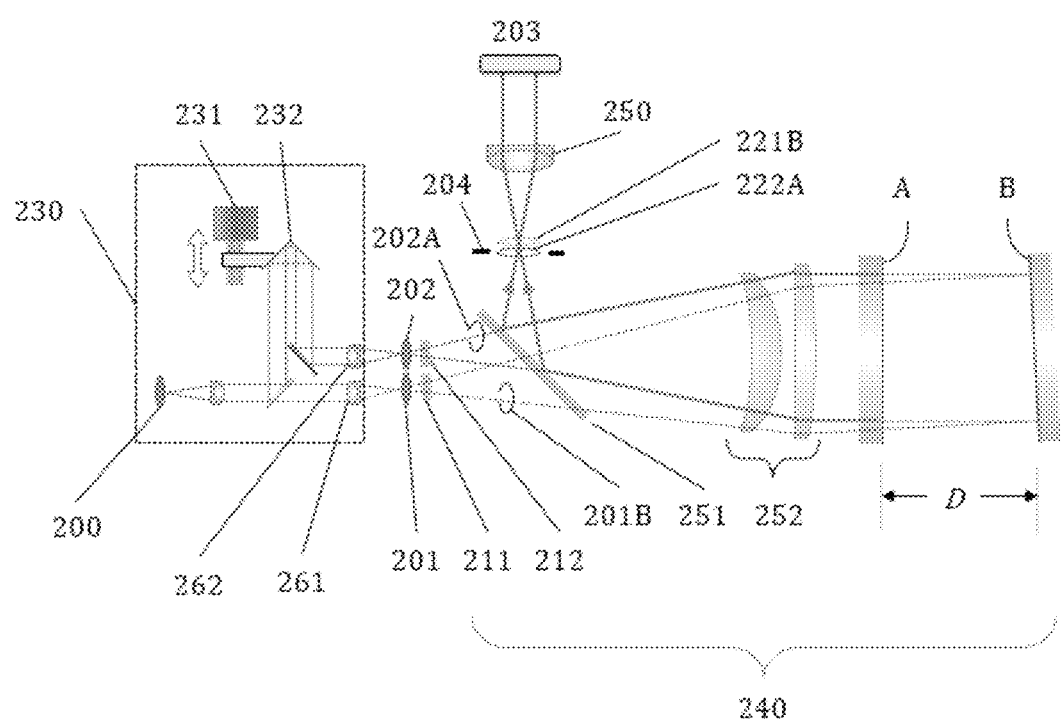
FIG. 6 is a schematic diagram of an embodiment of an interferometric system implementing a spatially extended source and mitigating the defocus effects that otherwise occur when using a spatially extended source.

For example, FIG. 6 is an optically schematic diagram for an embodiment that implements a spatially extended light source 200, and further optionally includes corrective optical elements 211 and 212 to overcome fringe visibility loss with large gaps D between the reference surface A and object surface B. The embodiment includes a collimator 252 and a beamsplitter 251. An aperture 204 that selects the multiple reflections so that only the beam 201B from source 201 reflecting from the reference surface B passes through an imaging lens 250 and a camera 203, while at the same time passing through only beam 202A from source 202 reflecting from source A to camera 203. A retro reflector 232 and a coupled electronically controlled delay line 231 adjust the phase delay between the two sources 201 and 202 to compensate for the overall optical path between reference surface A and object surface B.

In the embodiment of FIG. 6, the illuminator assembly 230 also includes imaging optics with an unequal optical path between the measurement and reference beams that lead to source images 201 and 202, respectively. Consequently, there is a defocus effects for light sources 201 and 202. The net effect of the illuminator 230 and of the main optical system 240 on the interference effect I(D) is given by $$I(D) = \frac{2}{R^2} \int_0^R \exp\ [i\Phi(\rho, D)]\rho d\rho \quad (12)$$

where the phase offset $$\Phi(\rho, D) = 2Dk\left(\sqrt{1-\left(\frac{\rho}{F_M}\right)^2} - \sqrt{1-\left(\frac{\rho}{F_L}\right)^2}\right) \quad (13)$$

where now $F_L$ is the effective focal length of the illuminator 230 and $F_M$ is the focal length of the main optical system 240. The defocus effect for the illuminator 230 has an opposite sign, because the path imbalance is equal and opposite to that of the main optical system 240. In FIG. 6, the focal length $F_L$ may for example be given by the focal lengths of focusing lenses 261 and 262 in the illuminator for forming the two light sources 201 and 202 from common spatially extended source 200, if the light entering these two lenses from the left is collimated (that is, focused at infinity). Other optical configurations may have a different effective focal length than this example.

In certain embodiments, the system of FIG. 6 may be designed to match the focal lengths $F_M$ and $F_L$ so that the fringe contrast is maximized. For example, in one embodiment, the defocus introduced by the illuminator 230 is equal and opposite to that introduced by the gap D between the object and reference surfaces. This may be achieved, for example, by having the focal length $F_L$ for illuminator 230 the same as the focal length $F_M$ for the main optical system. In this case, in Eq. (12), the two defocus contributions exactly cancel. Moreover, in further embodiments, the focal lengths $F_M$ and $F_L$ are selected to be close enough to substantially reduce the defocus effect caused by the spatially extended source in Eq. (12), e.g., with $F_M$ and $F_L$ being with 50% of each other, or preferably, within 20% of each other, or more preferably, within 10% of each other.

However, in other embodiments, it may not be possible or practical to match the defocus effects for the extended light source introduced by illuminator 230 and the main optical system 240. Accordingly, there are two focus compensating elements 211 and 212 for sources 201 and 202, respectively. In certain embodiments, compensating elements 211 and 212 are designed so as to provide a substantially equal and opposite phase difference φ between the reference source image 221B and object source image 221A as a function of position within the image of the respective images to that net effect given by Eq. (12). The result is high fringe visibility even for larger gaps D than would be possible without compensating elements. Compensating elements 211 and 212 may be fabricated as glass lenses, diffractive optics, or adjustable optics so as to provide the appropriate spatially dependent phase delay across light passing through such elements. Consistent with Eqs. (5) and (6), the spatial dependence may typically have radial symmetry, i.e., have a spatial dependence on the radial coordinate ρ only. However, more complex phase delay profiles may be necessary for a correspondingly more complex optical system.

In further embodiments, the compensation elements 211 and 212 may also be designed to impart a spatially dependent amplitude modulation (e.g., attenuation) to reduce the defocus effect caused by the spatially extended light source. For example, compensating elements 211 and 212 may also include apertures or masks, such as annular masks, so as to improve the fringe visibility over a range of possible values for gap D. The effect of such apertures is to restrict the range of integration in Eq. (12). For example, if we use an annular aperture with an outer radius $R_2=R$ and an inner radius $R_1<R_2$, Eq. (12) becomes:

$$I(D) = \frac{1}{N} \int_{R_1}^{R_2} \exp\ [i\Phi(\rho, D)]\rho d\rho \quad (14)$$

where N is a normalizing factor proportional to the area of the annulus. Because of the smaller range of integration, the integrands in Eq. (14) remain more constant than that for an integration over ρ from zero to R as in Eq. (12). The result is a larger absolute value for I(D), and thereby a greater fringe contrast.

More generally, the compensating elements 211 and 212 provide a spatially varying phase and/or amplitude modulation (e.g., a phase retardation and/or attenuation) for light passing through the elements so as to increase the amplitude of I(D) in the more generalized Eq. (15) shown below, which follows from Eq. (12) and further includes the effect of compensation elements 211 and 212 as the complex function Γ(ρ,D)

$$I(D) = \frac{2}{R^2} \int_0^R \Gamma(\rho, D) \exp\ [i\Phi(\rho, D)]\rho d\rho. \tag{15}$$

Although compensating elements 211 and 212 are shown positioned immediately after the sources 201 and 202, in further embodiments, they can be placed anywhere in the optical assembly, including inside the illuminator assembly 230. Furthermore, in yet further embodiments, the phase compensation can be achieved by a single compensation element in either the reference path or the measurement path, or by more than one compensation element in one or both of the reference and measurement paths. In general, embodiments include any optical configuration that creates a compensating phase distribution for extended sources 211 and 212 given a gap D between the reference surface A and object surface B to reduce the defocus effect otherwise caused by the spatial extension of the spatially extended light source.

For example, in one embodiment, a single compensating element 211 may be used and positioned immediately after source 201 (with element 212 removed), with element 211 comprising a radially symmetric retardation profile φ(ρ,D) to exactly cancel the defocus effect. For example, this single element 211 can provide the following retardation for light passing through it:

$$\Gamma(\rho,D) = \exp[i\phi(\rho,D)], \tag{16}$$

where $$\phi(\rho,D) = -\Phi(\rho,D), \tag{17}$$

and where the phase offset Φ(ρ, D) in Eq. (17) is given by Eq. (13).

SCOPE

It must be noted that as used herein and in the appended claims, the singular forms "a", "an", and "the" include plural referents unless the context clearly dictates otherwise, e.g., when the word "single" is used.

As used herein, the terms "adapted" and "configured" mean that the element, component or other subject matter is designed and/or intended to perform a given function. Thus, the use of the terms "adapted" and "configured" should not be construed to mean that a given element, component, or other subject matter is simply "capable of" performing a given function.

As used herein, the phrases "at least one of" and "one or more of," in reference to a list of more than one entity, means any one or more of the entity in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entity listed with "and/or" should be construed in the same manner, i.e., "one or more" of the entity so conjoined. Other entity may optionally be present other than the entity specifically identified by the "and/or" clause, whether related or unrelated to those entities specifically identified.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of embodiments of the invention have been described. Nevertheless, it will be understood that various modifications may be made without departing from the spirit and scope of the invention. Accordingly, other embodiments are within the scope of the following claims.

What is claimed is:

1. Interferometric optical system for measuring one or more surfaces of a test object, the system comprising
   i) a reference object comprising a partially reflective reference surface;
   ii) a light source module configured to direct first and second input beams through the reference surface to the test object at an angle to one another;
   iii) a detector positioned to detect light reflected from the reference surface and the one or more surfaces of the test object; and iv) an aperture positioned to selectively block light from reaching the detector, wherein the angle between the first and second input beams is selected to cause the aperture to block light from the first input beam reflected by the reference surface and pass light from second input beam reflected by the reference surface, v) wherein the two input beams have a mutual coherence length smaller than twice an optical distance between the reference surface and any of the test object surfaces, vi) wherein the light source module comprises a common light source from which the first and second input beams are derived, and vii) wherein the common light source is a spatially extended light source.

2. The system of claim 1, wherein the spatially extended light source has an emitting area with a diameter greater than 0.1 mm.

3. The system of claim 2, wherein the diameter of the emitting area is greater than 1 mm.

4. The system of claim 2, wherein the diameter of the emitting area is between 0.1 mm and 10 mm.

5. The system of claim 1, wherein the light reflected from the reference surface and the one or more surfaces of the test object interfere at the detector to produce an interference pattern having a fringe contrast.

6. The system of claim 5, further comprising at least one compensation element positioned along a light path from the light source module to the detector for reducing a defocus effect in the fringe contrast of the interference pattern caused by the spatial extension of the spatially extended light source.

7. The system of claim 6, wherein the at least one compensation element imparts a spatially dependent phase delay, a spatially dependent attenuation, or both, for light transmitting through the at least one compensation element.

8. The system of claim 5, wherein the reference surface and the one or more surfaces of the test object produce an unequal path length for light from the first and second input beams from the light source module to the detector, and wherein the spatial extension of the spatially extended light source cause a defocus effect in the fringe contrast of the interference pattern I(D) as a function of a distance D between the reference surface and the one or more surfaces of the test object.

9. The system of claim 8, wherein the light source module comprises an imaging system having an effective focal length $F_L$ and the imaging system further comprises a collimator for collimating the first and second input beams from the light source module and wherein the collimator has an effective focal length $F_M$.

10. The system of claim 9, wherein the defocus effect I(D) can be expressed as:

$$I(D) = \frac{2}{R^2} \int_0^R \exp\left[i\Phi(\rho, D)\right] \rho \, d\rho$$

where $$\Phi(\rho, D) = 2Dk\left(\sqrt{1 - \left(\frac{\rho}{F_M}\right)^2} - \sqrt{1 - \left(\frac{\rho}{F_L}\right)^2}\right),$$

and where k is the wavenumber of light emitted from the common light source, R is a radius of the emitting area for the spatially extended light source, and ρ is a radial distance from an optical axis for the light emitted from the common light source.

11. The system of claim 9, wherein $F_M$ and $F_L$ are selected to have values within 50% of one another to reduce the defocus effect.

12. The system of claim 8, further comprising at least one compensation element positioned along a light path from the light source module to the detector for reducing the defocus effect in the fringe contrast of the interference pattern caused by the spatial extension of the spatially extended light source.

13. The system of claim 12, wherein the at least one compensation element comprises a first compensation element positioned along the light path from the light source module to the detector for the first input beam and a second compensation element positioned along the light path from the light source module to the detector for the second input beam.

14. The system of claim 12, wherein the at least one compensation element comprises a phase plate for imparting a spatially dependent phase delay for light transmitting through the phase plate.

15. The system of claim 14, wherein the spatially dependent phase delay is spatially dependent on a radial distance ρ from an optical axis for the light transmitting through the phase plate.

16. The system of claim 1, further comprising a test object stage for adjustably positioning the test object relative to the reference object and configurable to cause a selected one of the test object surfaces to reflect light from the first input beam to pass through the aperture and interfere at the detector with the light from the second input beam that is reflected by the reference surface and passed by the aperture.

17. The system of claim 1, wherein the light source module directs the first input beam towards the reference surface from a first source location and directs the second input beam towards the reference surface from a second source location, and wherein the first and second source locations are spatially separated from one another.

18. The system of claim 1, wherein the common light source comprises a spatially extended light-emitting diode, a super-luminescent diode, a multimode laser, or an incandescent bulb.

19. The system of claim 1, wherein the light from the second input beam reflected by the reference surface and passed by the aperture defines a reference beam, and wherein the aperture is configured to pass light from the first input beam that is reflected by a selected surface of the test object to define a measurement beam, and wherein the detector is positioned to measure interference produced by a superposition of the reference beam and the measurement beam.

20. The system of claim 1, wherein the light source module is configurable to adjust an optical path length difference between the reference and measurement beams over a range greater than the mutual coherence length.

21. The system of claim 20, wherein the test object comprises multiple surfaces positioned to reflect light from the input beams, and wherein the mutual coherence length is smaller than a round-trip optical path between any two of the multiple surfaces of the test object.

22. The system of claim 20, further comprising an electronic control system coupled to the detector and the light source module, and configured to variably adjust the optical path length difference.

23. An interferometric method for measuring one or more surfaces of a test object comprising:
   i) directing first and second input beams through a partially reflective reference surface to the test object at an angle to one another;
   ii) detecting light reflected from the reference surface and the one or more surfaces of the test object; and
   iii) using an aperture to block light from the first input beam reflected by the reference surface and pass light from second input beam reflected by the reference surface,
   iv) wherein the two input beams have a mutual coherence length smaller than twice an optical distance between the reference surface and any of the test object surfaces,
   v) wherein the light source module comprises a common light source from which the first and second input beams are derived, and
   vi) wherein the common light source is a spatially extended light source.

* * * * *

UNITED STATES PATENT AND TRADEMARK OFFICE
CERTIFICATE OF CORRECTION

PATENT NO. : 12,104,897 B2
APPLICATION NO. : 17/887678
DATED : October 1, 2024
INVENTOR(S) : Peter J. de Groot It is certified that error appears in the above-identified patent and that said Letters Patent is hereby corrected as shown below:

On the Title Page

Column 1
Item (54) (Title), delete "INTEROMETRIC" and insert -- INTERFEROMETRIC --

In the Specification

Column 1
Line 1, delete "INTEROMETRIC" and insert -- INTERFEROMETRIC --

Signed and Sealed this
Twelfth Day of November, 2024

Katherine Kelly Vidal
*Director of the United States Patent and Trademark Office*